United States Patent
Dettinger et al.

(10) Patent No.: US 7,213,014 B2
(45) Date of Patent: May 1, 2007

(54) APPARATUS AND METHOD FOR USING A PREDEFINED DATABASE OPERATION AS A DATA SOURCE FOR A DIFFERENT DATABASE OPERATION

(75) Inventors: Richard Dean Dettinger, Rochester, MN (US); Jennifer Lynn La Rocca, Rochester, MN (US); Rick Joseph Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 10/401,291

(22) Filed: Mar. 27, 2003

(65) Prior Publication Data

US 2004/0193567 A1 Sep. 30, 2004

(51) Int. Cl.
*G06F 17/30* (2006.01)
(52) U.S. Cl. .................... 707/3; 707/1; 707/5
(58) Field of Classification Search ........... 707/1–10, 707/104.1, 200, 203, 100
See application file for complete search history.

(56) References Cited

U.S. PATENT DOCUMENTS

| | | | |
|---|---|---|---|
| 5,802,518 A * | 9/1998 | Karaev et al. .............. 707/9 |
| 5,864,871 A * | 1/1999 | Kitain et al. ............. 707/104.1 |
| 6,377,948 B2 * | 4/2002 | Kikuchi et al. ............ 707/10 |
| 6,578,028 B2 * | 6/2003 | Egilsson et al. ............ 707/2 |
| 6,704,740 B1 * | 3/2004 | Lang ...................... 707/102 |
| 6,725,227 B1 | 4/2004 | Li |
| 6,847,960 B1 * | 1/2005 | Li et al. .................... 707/3 |
| 6,868,414 B2 * | 3/2005 | Khanna et al. ............. 707/3 |
| 6,889,223 B2 * | 5/2005 | Hattori et al. ............. 707/3 |
| 7,080,067 B2 * | 7/2006 | Nonomura et al. ........ 707/3 |
| 2003/0172056 A1 * | 9/2003 | Dettinger et al. .......... 707/3 |

OTHER PUBLICATIONS

Dettinger et al., IBM U.S. Appl. No. 10/083,075 (ROC920020044US1), filed Feb. 26, 2002, "Improved Application Portability and Extensibility Through Database Schema and Query Abstraction".

* cited by examiner

*Primary Examiner*—Don Wong
*Assistant Examiner*—Marc R. Filipczyk
(74) *Attorney, Agent, or Firm*—Patterson & Sheridan, LLP (57) ABSTRACT

A database operation mechanism includes the capability of specifying a predefined database operation as a source of data for a different database operation. When the different database operation needs to be performed, the database operation mechanism determines whether the different database operation can use a predefined database operation as a data source. If so, the predefined database operation is specified as the source of data for the different database operation. If the different database operation cannot use a predefined database operation as a data source, the database operation mechanism determines whether the different database operation can use a modified form of a predefined database operation as a data source. If so, the different database operation may use the modified predefined database operation as a source of data. If the different database operation cannot use a predefined database operation or a modified form of a predefined database operation as a data source, a different database operation is generated and executed.

6 Claims, 8 Drawing Sheets

FIG. 1

SQL Insert with Subselect

Insert into TableX (Col 1, Col2, Col3) (Select ColX, ColY, ColZ from TableY);

PatientInfo

| Surname | GivenName | Diagnosis | Prescriptions |
|---------|-----------|-----------|---------------|

FIG. 4

Contacts

| L_Name | Problem | Medications |
|--------|---------|-------------|

FIG. 5

SQL Insert with Subselect

Insert into Contacts (L_Name, Problem, Medications) (Select * from PatientInfo);

FIG. 6

Predefined Query

Select * from PatientInfo

Returns: Surname, GivenName, Diagnosis, Prescriptions

Data Repository Abstraction for PatientInfo Table — 910

Field
  Name="LastName"
  Access Method="Simple"
    Table=PatientInfo
    Column=Surname Field
  Name="FirstName"
  Access Method="Simple"
    Table=PatientInfo
    Column=GivenName Field
  Name="Condition"
  Access Method="Simple"
    Table=PatientInfo
    Column=Diagnosis Field
  Name="Meds"
  Access Method="Simple"
    Table=PatientInfo
    Column=Prescriptions

FIG. 10

Data Repository Abstraction for Contacts Table — 1010

Field
  Name="LastName"
  Access Method="Simple"
    Table=Contacts
    Column=L_Name Field
  Name="Condition"
  Access Method="Simple"
    Table=Contacts
    Column=Problem PatientInfo

| Surname | GivenName | Diagnosis | Prescriptions |
|---|---|---|---|

Contacts

| L_Name | Problem |
|---|---|

FIG. 11

Existing Abstract Query

Select * from PatientInfo

Returns:   LastName=<Surname>, FirstName=<GivenName>,
  Condition=<Diagnosis>, Meds=<Prescriptions>

FIG. 12

Abstract Insert Statement

Insert LastName, Condition into Contacts from PatientInfo

FIG. 13

Generated Abstract Statement

Insert into Contacts (LastName, Condition)(Select * from PatientInfo)

FIG. 14

Generated Run-Time Statement

Insert into Contacts (L_Name, Problem)(Select Surname, Condition from PatientInfo)

FIG. 15

Existing Abstract Query

Select LastName, Meds from PatientInfo

Returns: LastName=<Surname>, Meds=<Prescriptions>

FIG. 16

Abstract Insert Statement

Insert LastName, Condition into Contacts from PatientInfo

FIG. 17

Modified Abstract Query (Example #1)

Select LastName, Condition, Meds from PatientInfo

Returns: LastName=<Surname>, Condition=<Diagnosis>,
Meds=<Prescriptions>

FIG. 18

Generated Abstract Statement

Insert into Contacts (LastName, Condition)(Select LastName, Condition, Meds from PatientInfo)

FIG. 19

Generated Run-Time Statement

Insert into Contacts (L_Name, Problem)(Select Surname, Diagnosis, Prescriptions from PatientInfo)

FIG. 20

Modified Abstract Query (Example #2)

Select * from PatientInfo

Returns:   LastName=<Surname>, FirstName=<GivenName,
          Diagnosis=<Condition>, Meds=<Prescriptions>

FIG. 21

Generated Abstract Statement

Insert into Contacts (LastName, Condition)(Select * from PatientInfo)

FIG. 22

Generated Run-Time Statement

Insert into Contacts (L_Name, Problem)(Select Surname, Diagnosis from PatientInfo)

APPARATUS AND METHOD FOR USING A PREDEFINED DATABASE OPERATION AS A DATA SOURCE FOR A DIFFERENT DATABASE OPERATION

RELATED APPLICATION

This patent application is related to co-pending U.S. patent application Ser. No. 10/083,075 entitled "IMPROVED APPLICATION PORTABILITY AND EXTENSIBILITY THROUGH DATABASE SCHEMA AND QUERY ABSTRACTION", filed Feb. 26, 2002, which is incorporated herein by reference.

BACKGROUND OF THE INVENTION

1. Technical Field

This invention generally relates to computer systems, and more specifically relates to apparatus and methods for performing operations on a database.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using database operations such as queries. Other database operations, such as an insert or an update, may manipulate information stored in the database. A database query usually specifies conditions that apply to data stored in the database, and may specify relatively complex logical operations. The database is searched for data that satisfy the conditions in the query, and the matching data is returned as the query result in what is typically referred to as a "result set".

Structured Query Language (SQL) is one very popular language for querying a relational database. SQL is extremely powerful, yet effectively using SQL requires extensive knowledge of SQL syntax and intimate knowledge and understanding of the structure (or schema) of the underlying database. Many database users have no desire to become SQL experts, they simply want to be able to perform database operations to retrieve needed data from the database. The related application, Ser. No. 10/083,075 filed on Feb. 26, 2002, discloses a mechanism for abstracting queries so that users do not need to know the database schema or details of SQL to perform database operations. An abstract query is translated into SQL or other query languages when the query is executed. Current implementations of SQL require that a table or other data storage entity be specified as a source of data in an SQL query. Once a query is defined, it may be stored for later use. However, if no predefined query matches the query that needs to be performed, a new query must be generated. There is currently no way to use a predefined query as a data source for a different query. As a result, the reusability of a predefined query is limited. Without an apparatus and method for using predefined queries as data sources for a different query, the computer industry will continue to suffer from inefficient mechanisms and methods for performing database operations.

DISCLOSURE OF INVENTION

According to the preferred embodiments, a database operation mechanism includes the capability of specifying a predefined database operation as a source of data for a different database operation. When the different database operation needs to be executed, the database operation mechanism determines whether there exists a predefined database operation that returns a result set that can satisfy the different database operation. If so, the predefined database operation is specified as the source of data for the different database operation. If there is no predefined database operation that returns a result set that can satisfy the different database operation, the database operation mechanism determines whether there exists a predefined database operation that can be modified to return a result set that can satisfy the different database operation. If so, the predefined database operation may be modified, and the modified database operation may be specified as the source of data for the different database operation. If there is no predefined database operation that exists or can be modified to return a result set that can satisfy the different database operation, a different database operation is generated and executed.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION 1.0 Overview

The present invention relates to performing operations on a database. For those not familiar with databases or database operations, this Overview section will provide background information that will help to understand the present invention.

Known Databases and Database Operations

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is one specific example of a database operation. Other known examples of database operations include inserts, updates, creates, drops, alters, grants, revokes, etc.

A query is an expression that is evaluated by a database manager. The expression may specify one or more conditions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

One popular way to define a query uses Structured Query Language (SQL). SQL defines a syntax for generating and processing queries that is independent of the actual structure and format of the database. Information about the internal storage of the data is not required as long as the query is written in terms of expressions that relate to values in columns from tables. While SQL is very powerful, it requires that users have considerable knowledge regarding SQL and detailed information regarding the database schema. There are at least two fundamental problems with SQL. First, many potential users of a database are not SQL experts, yet they would benefit greatly from being able to access data in a database. Second, even if a user is an SQL expert, SQL queries are written in terms of defined database schema. If the schema for the database changes, stored queries may not function correctly. For example, if an SQL query specifies a particular column name in the database, the SQL query will be invalid if the name of the column is changed in the database schema. These problems show that SQL, while powerful, has its drawbacks.

Queries may generally be stored so they can be executed again in the future, if needed. However, if a new query is needed that is not identical to a stored query, the new query must be generated and executed. Note, however, that each SQL query is typically written to access a database table. SQL as known in the art does not allow a database operation to be a source of data for another database operation.

Example of Prior Art SQL Insert with Subselect

Figure 2:
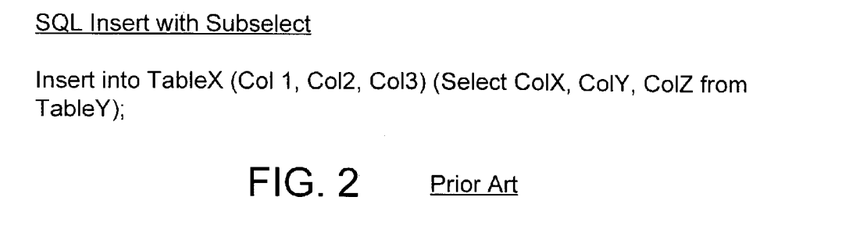
FIG. 2 is an example of a prior art SQL insert with subselect statement.

An example of a specific type of prior art database operation is shown in FIG. 2, which represents an example of an SQL insert with subselect statement. The "select" statement in FIG. 2 is called a "subselect" because it is used as an argument to the insert statement. The subselect statement specifies that data be retrieved from ColX, ColY and ColZ of TableY. The insert statement specifies that the data retrieved from ColX, ColY and ColZ of TableY be inserted into Col1, Col2 and Col3 of TableX. When a prior art query processor processes the insert with subselect statement in FIG. 2, it checks to make sure that Col1 of TableX and ColX of TableY have a compatible schema definition 125A, shown graphically in FIG. 3. The query processor will also assure that Col2 of TableX and ColY of TableY have a compatible schema definition 125B, and that Col3 of TableX and ColZ of TableY have a compatible schema definition 125C. In the prior art, "compatible schema definition" means that the columns must define equivalent data type, but the length of the data need not be strictly identical. For example, if ColX in TableY is a text column defined to be 16 characters wide, and if Col1 in TableX is a text column defined to be 20 characters wide, the data from ColX is of the same type (text) and is less than or equal to the width of the corresponding column in TableX, so the schema definitions for these two columns are said to be compatible. Note that if the situation were reversed, with ColX in TableY defined as a text column 20 characters wide, and Col1 in TableX is defined as a text column 16 characters wide, the schema definitions for these columns are incompatible because the 20 characters in ColX of TableY will not fit into the 16 characters in Col1 of TableX.

Figure 3:
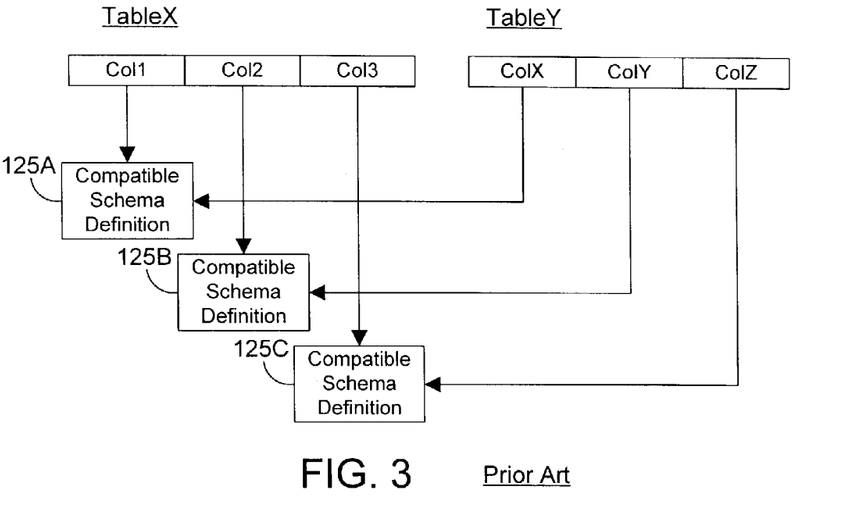
FIG. 3 is a schematic diagram that graphically shows some of the requirements for the prior art SQL insert with subselect shown in FIG. 2 to execute properly.

In addition to checking for compatible schema definitions between columns as shown in FIG. 3, a prior art query processor that processes the SQL insert with subselect statement in FIG. 2 will also require that the number of columns returned in the subselect statement from TableY be less than or equal to the number of columns in TableX. If the schema is incompatible, or if the select statement does not return the same number of columns expected by the insert statement, the query processor of the prior art cannot process the query and will return an error to the user. The strictures of current SQL thus greatly inhibit the flexibility of queries and their reuse.

2.0 Detailed Description

The preferred embodiments provide an apparatus, method and program product that allows a predefined database operation to be used as a data source for a different database operation. The general concept is similar to "piping" between commands in a Unix shell. A database operation, such as a query, may be stored, and may then be used as a data source for a different query. This greatly simplifies the task of building new queries, and promotes reuse of previously-defined (i.e., predefined) queries. By specifying a predefined query as a data source for a new query, the flexibility of querying databases is significantly increased.

Figure 1:
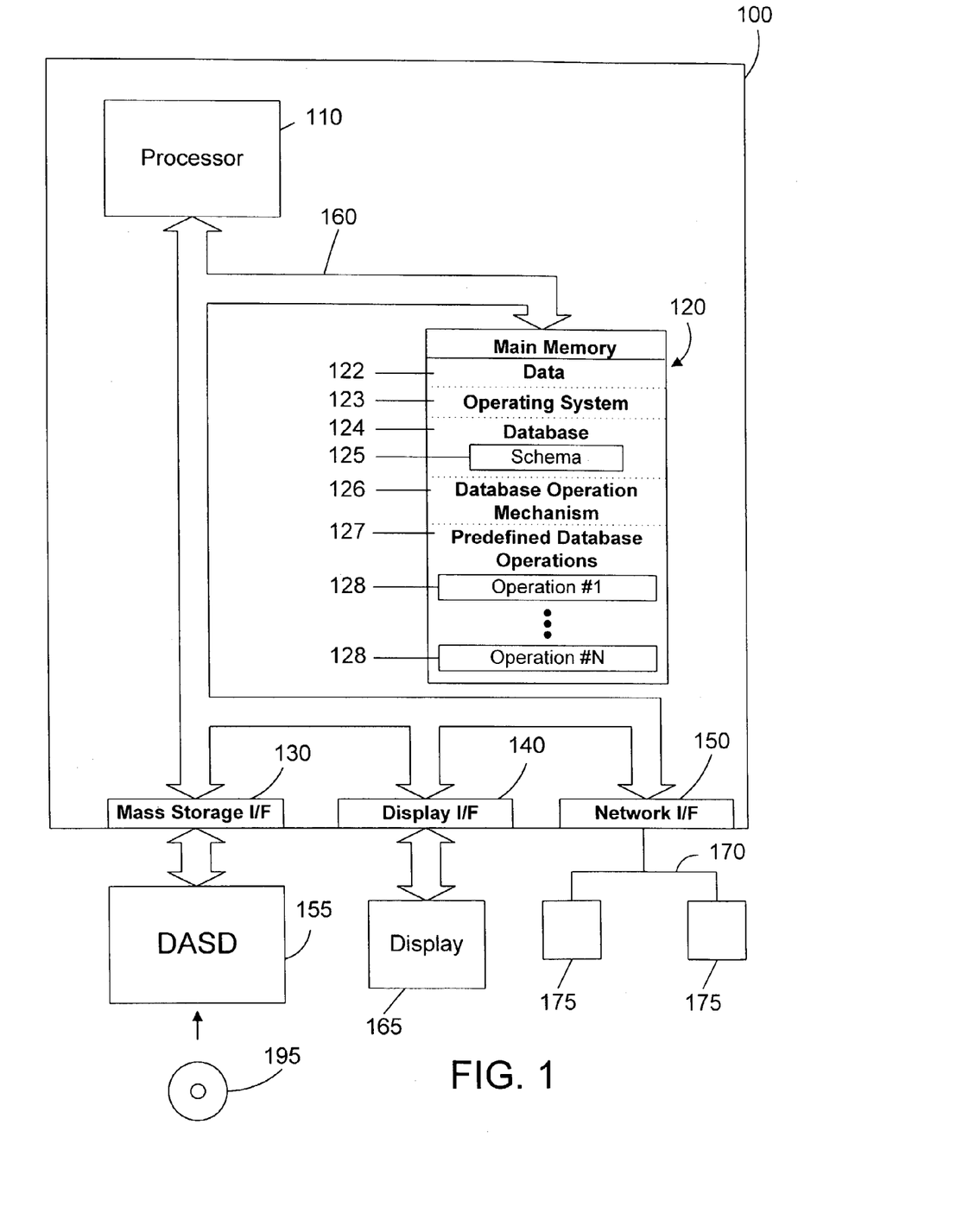
FIG. 1 is a block diagram of an apparatus in accordance with the preferred embodiments.

Referring now to FIG. 1, a computer system 100 is one suitable implementation of an apparatus in accordance with the preferred embodiments of the invention. Computer system 100 is an eServer iSeries computer system manufactured by International Business Machines Corporation. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD RW drive, which may store data to and read data from a CD RW 195.

Main memory 120 in accordance with the preferred embodiments contains data 122, an operating system 123, a database 124, a database operation mechanism 126, and one or more predefined database operations 127. Data 122 represents any data that serves as input to or output from any program in computer system 100. Operating system 123 is a multitasking operating system known in the industry as OS/400; however, those skilled in the art will appreciate that the spirit and scope of the present invention is not limited to any one operating system. Database 124 comprises any suitable database for storing data, whether now known or developed in the future, including currently-known databases such as relational databases and object oriented databases. Database 124 defines a schema 125 that specifies the structure of the database. For example, for a relational database, schema 125 defines tables in the database and defines the columns in the tables.

Database operation mechanism 126 is a mechanism that processes database operations in accordance with the preferred embodiments. Thus, for a database query, the database operation mechanism 126 will process the query to retrieve data from the database 124. Predefined database operations 127 include one or more individual operations 128, shown in FIG. 1 as operation#1 to operation#N. These operations 128 have been previously defined, and may be executed without the need of redefining an identical operation from scratch. The database operation mechanism 126 of the preferred embodiments has the ability to specify a predefined database operation 128 as a data source for a different database operation.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, database 124, database operation mechanism 126, and predefined database operations 127 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 123. Operating system 123 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Figure 4:
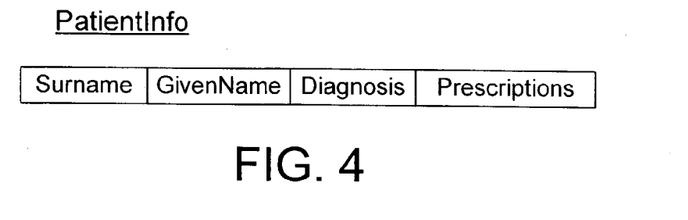
FIG. 4 is a block diagram of a sample PatientInfo table in a database.
Figure 5:
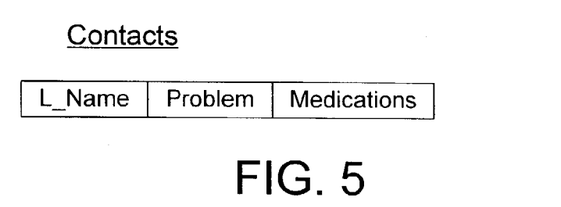
FIG. 5 is a block diagram of a sample Contacts table in a database.
Figure 6:
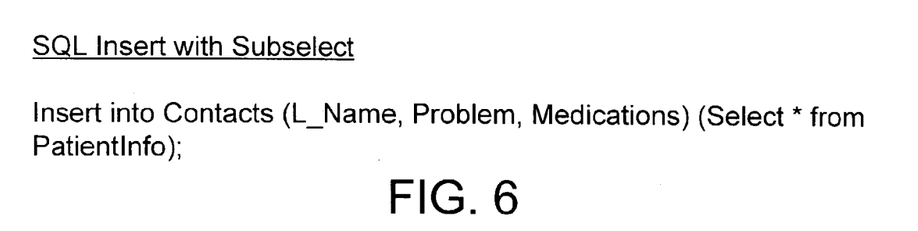
FIG. 6 is an example of a query that may be processed in accordance with the preferred embodiments.

An example is now shown in FIGS. 4–7 to illustrate the general concepts of a first embodiment of the present invention. The tables shown in FIGS. 4 and 5 are assumed to be tables that store medical information for patients. FIG. 4 shows a simple PatientInfo table that includes four defined columns: Surname, GivenName, Diagnosis, and Prescriptions. FIG. 5 shows a simple Contacts table that includes three defined columns: L_Name, Problem and Medications. FIG. 6 shows an SQL insert with subselect statement. Note, however, that the subselect statement "Select * from PatientInfo" will return the four columns in the PatientInfo table shown in FIG. 4. Note, however, that there are only three specified columns in the insert portion of the statement. Because there is a mismatch between the number of columns in the subselect statement and the number of columns in the insert statement, a prior art SQL query processor will not be able to complete the insert with subselect operation, and will indicate an error to the user.

The database operation mechanism 126 of the preferred embodiments provides enhanced function when compared to prior art SQL because it knows how to process the insert with subselect statement in FIG. 6. The number of columns returned by the select statement need not match the number of columns being inserted, so long as the columns returned in the result set of the select statement are included in the columns being inserted. The database operation mechanism 126 thus provides greater flexibility by allowing a mismatch in the number of columns in the subselect statement and the insert statement without generating an error.

Figure 7:
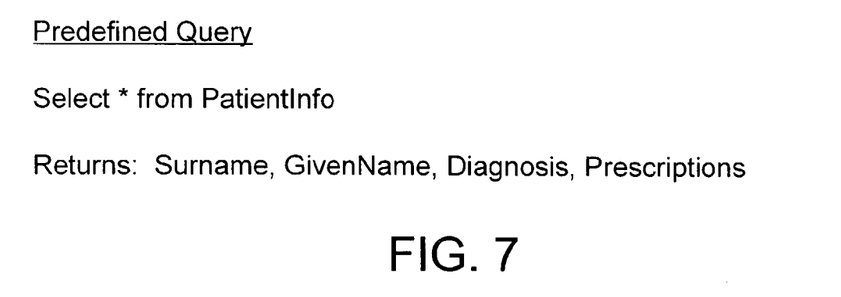
FIG. 7 is an example of a predefined query, showing how the query in FIG. 6 may specify the predefined query as a data source for the insert operation.

Another benefit provided by the database operation mechanism 126 is the ability to use a predefined database operation as a data source for a different database operation. For example, as shown in FIG. 7, we assume that a predefined query "Select * from PatientInfo" exists, and is stored as an individual operation 128 in the predefined database operations 127 shown in FIG. 1. This predefined database operation in FIG. 7 may be specified as a data source for the insert operation in FIG. 6. As a result, the database operation mechanism 126 can execute the predefined query in FIG. 7, then use the result set returned from executing the predefined query as data input to the insert operation of FIG. 6. Thus, the result set from executing the predefined query in FIG. 7 returns values in Surname, GivenName, Diagnosis, and Prescriptions. We assume for this example in FIGS. 4 and 5 that the Surname column in the PatientInfo table has an identical schema definition as the L_Name column in the Contacts table. In similar fashion, we assume that the Diagnosis column in the PatientInfo table has an identical schema definition as the Problem column in the Contacts table, and that the Prescriptions column in the PatientInfo table has an identical schema definition as the Medications column in the Contacts table.

Because the insert statement includes only three columns, the database operation mechanism 126 will select from the result set of the "Select * from PatientInfo" operation those columns that correspond to the columns in the insert statement. We assume for this example that Surname and L_Name both contain a patient's last name; that Diagnosis and Problem both indicate a patient's medical condition; and that Prescriptions and Medications both contain a list of prescription medications that the patient is currently taking. With this information, the database operation mechanism 126 will recognize that the data it needs for the insert statement exists in the result set of the subselect statement, so the insert can be performed even though the number of columns (4) returned by the subselect statement is not identical to the number of columns (3) specified in the insert statement. The database operation mechanism 126 thus provides enhanced functionality compared to prior art SQL processors by allowing a mismatch between the number of columns returned by the subselect operation and the number of columns specified in the insert operation. In addition, the database operation mechanism 126 allows a predefined query to be specified as a data source for a different database operation.

Figure 8:
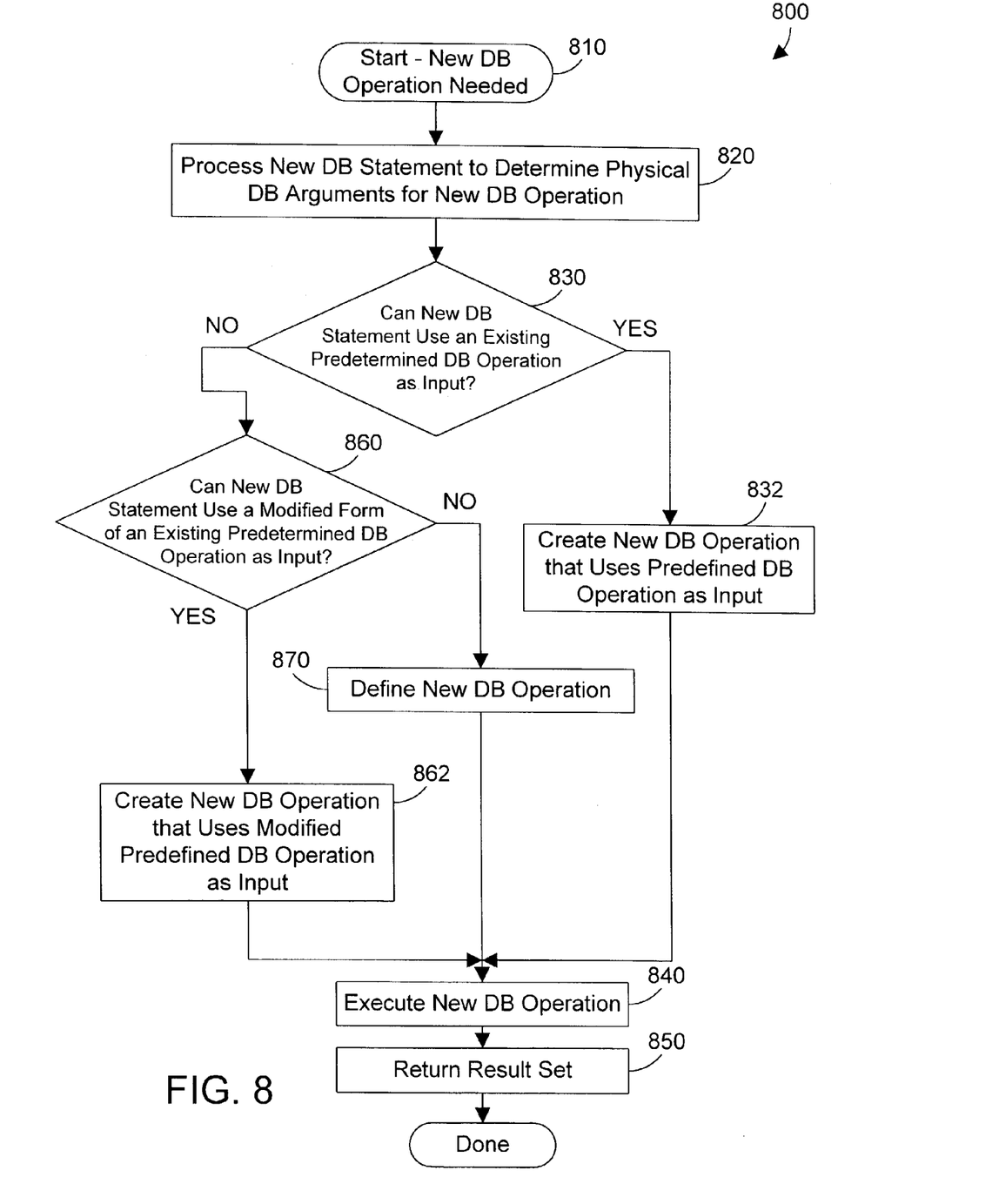
FIG. 8 is a flow diagram of a method for processing a database operation in accordance with the preferred embodiments.

Referring to FIG. 8, a method 800 in accordance with the preferred embodiments represents steps that may be performed by the database operation mechanism 126 of FIG. 1. Method 800 starts when a new database operation is needed (step 810). A statement corresponding to the new database operation is processed to determine which physical arguments in the database are affected (step 820). Next, step 830 determines whether there is an existing predetermined database operation that may be used as input for the new database statement. If so (step 830=YES), a new database operation is created that uses the predefined database operation as input (step 832). The new database operation is then executed (step 840), using the result set of the predefined database operation as a data source. The result set of the new database operation is then returned (step 850). Note that the flow of method 800 from step 810 to steps 820, 830=YES, 832, 840 and 850 represents steps performed by the database operation mechanism 126 of FIG. 1 when processing the SQL insert with subselect statement in FIG. 6 using the predefined query in FIG. 7 as a data source.

Step 832 may be implemented in a number of different ways. For example, step 832 could execute the predefined database operation, and provide the results set as input to the new database operation. In the alternative, the new database operation may be constructed that is an optimized, singular statement that uses the predefined database operation as input. In similar fashion, step 862 could modify a predefined database operation, execute the modified database operation, and provide the results set as input to the new database operation. In the alternative, the new database operation may be constructed that is an optimized, singular statement that uses the modified form of the predefined database operation as input. Of course, other implementations of steps 832 and 862 are also possible, all of which are within the scope of the preferred embodiments.

If no existing predefined database operation exists can be used as input to the new database operation (step 830=NO), step 860 then determines whether the new database statement can use a modified form of an existing predetermined database operation as input. If not (step 860=NO), a new database operation is defined (step 870), the new database operation is executed (step 840), and the result set from executing the new database operation is returned (step 850). If a predefined database operation may be modified to return a compatible result set (step 860=YES) that includes the physical database arguments in the new database statement without adding to the rows returned, a new database operation is created that uses a modified form of a predefined database operation as input (step 862). The new database operation is then executed (step 840) using the result set from the modified database operation as a data source, and the result set is returned (step 850).

Note that step 860 in FIG. 87 may include one or more suitable criteria to determine whether or not it is desirable to modify a predefined database operation, assuming one exists. In other words, step 860 need not answer YES if a predefined operation CAN be modified but it would not be desirable to do so for some reason. The preferred embodiments expressly extend to deciding whether or not to modify a predefined database operation based on one or more criteria in step 860.

Figure 9:
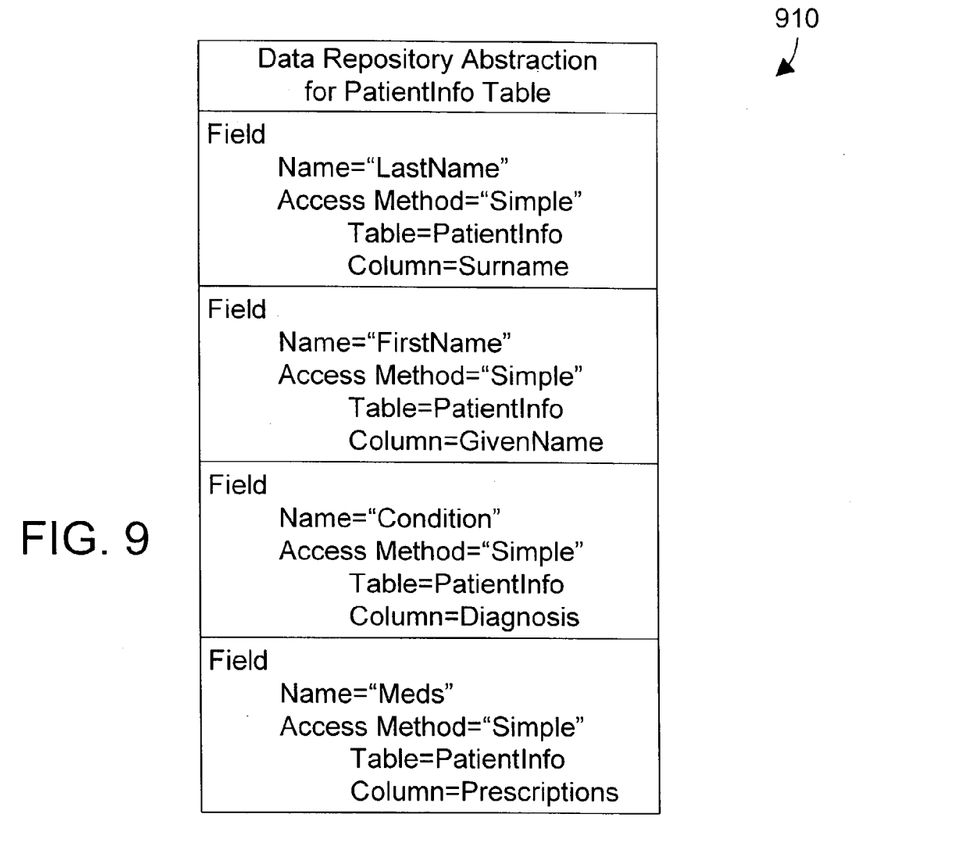
FIG. 9 is a table showing how the information in the PatientInfo table of FIG. 4 may be abstracted to remove details of the database schema.

FIGS. 4–7 show the first embodiment that provides a database operation mechanism that is capable of specifying a predefined database operation as a data source in an SQL-type statement. A second embodiment of the present invention provides a database operation mechanism that is capable of specifying a predefined database operation as a data source in an abstract database operation, as illustrated in FIGS. 9–15. The related patent application, Ser. No. 10/083,075 filed on Feb. 26, 2002, discloses a mechanism for abstracting a query so the user need not understand the details of SQL and need not know about the detailed schema of the underlying database in order to perform database operations. The abstraction is performed using data repository abstractions that contain information that maps an abstract query to the underlying database columns or elements. An example of a suitable data repository abstraction 910 for the PatientInfo table in FIG. 4 in accordance with the teachings of the related application is shown in FIG. 9. Note that the data repository abstraction 910 includes information that maps an abstract name, such as LastName, to a corresponding column, such as Surname, in the PatientInfo table. In like manner, the FirstName abstract name is mapped to the GivenName column in the PatientInfo table; the Condition abstract name is mapped to the Diagnosis column in the PatientInfo table; and the Meds abstract name is mapped to the Prescriptions column in the PatientInfo table. The data repository abstraction 910 thus provides information that allows common abstract names to be used across multiple tables by mapping the appropriate database columns to the corresponding abstract names.

Figure 10:
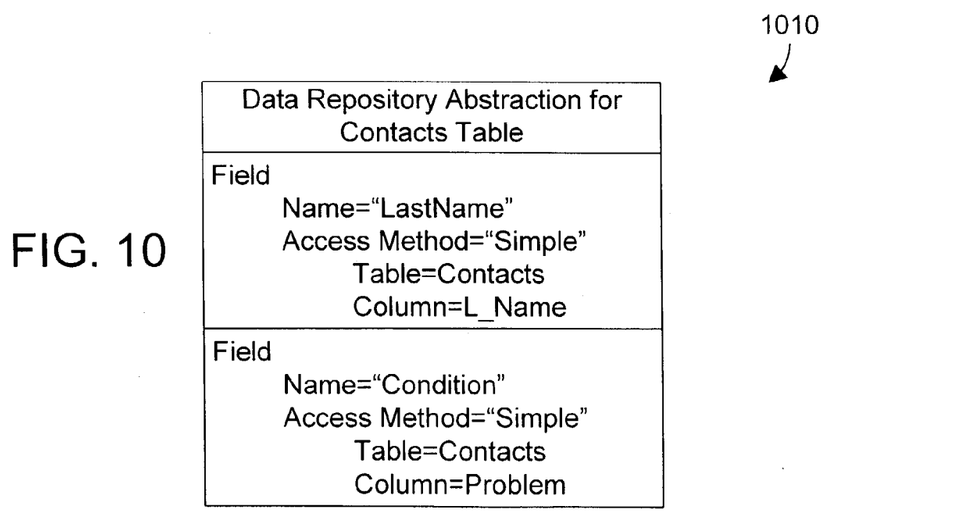
FIG. 10 is a table showing how the information in the Contacts table of FIG. 5 may be abstracted to remove details of the database schema.
Figure 11:
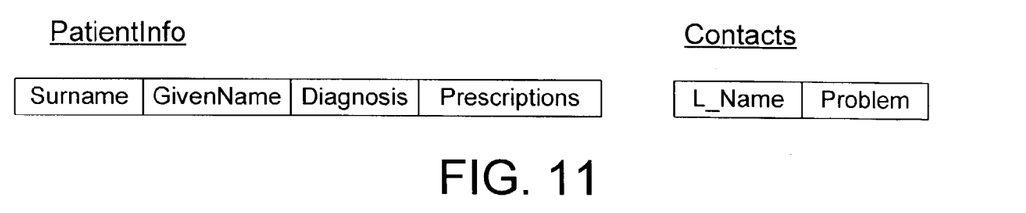
FIG. 11 shows the PatientInfo table in FIG. 4 and a modification of the Contacts table in FIG. 5.

FIG. 11 shows the PatientInfo table in FIG. 4, along with a different version of the Contacts table in FIG. 5 that excludes the Medications column. Referring to FIG. 10, a data repository abstraction 1010 for the Contacts table shown in FIG. 11 maps the abstract name LastName to the column L_Name in the Contacts table, and maps the abstract name Condition to the column Problem in the Contacts table.

Figure 12:
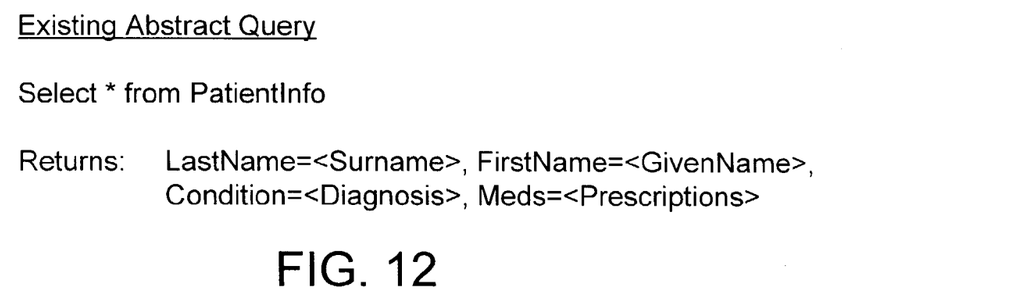
FIG. 12 shows an example of an existing abstract query for the PatientInfo table of FIG. 11 in accordance with the preferred embodiments.

We assume that an existing abstract query exists as shown in FIG. 12, "Select * from PatientInfo". This query returns the values of the Surname column (shown as <Surname>in FIG. 12) as the values of the LastName abstract name; returns the values of the GivenName column as the values of the FirstName abstract name; returns the values of the Diagnosis column as the values of the Condition abstract name; and returns the values of the Prescriptions column as the values of the Meds abstract name. Note that the mapping between columns in the PatientInfo table and the corresponding abstract names is performed using the information in the data repository abstraction 910 shown in FIG. 9 for the PatientInfo table in FIGS. 4 and 11.

Figure 13:
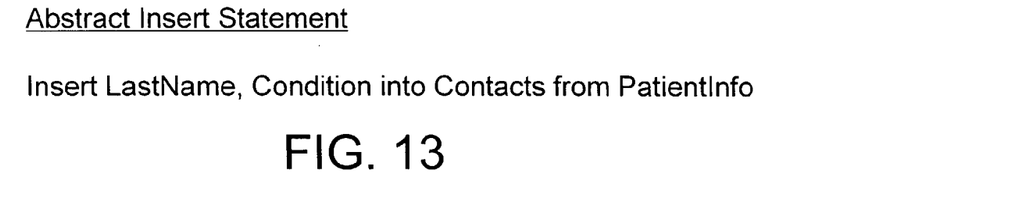
FIG. 13 shows an abstract insert statement for the Contacts table of FIG. 11 in accordance with the preferred embodiments.
Figure 14:
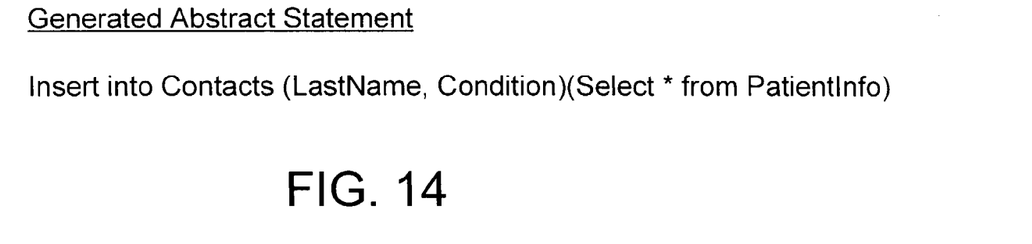
FIG. 14 shows how the database operation mechanism of the preferred embodiments may generate an abstract statement for the insert statement in FIG. 13 that specifies the existing abstract query in FIG. 12 as a data source for the insert statement.
Figure 15:
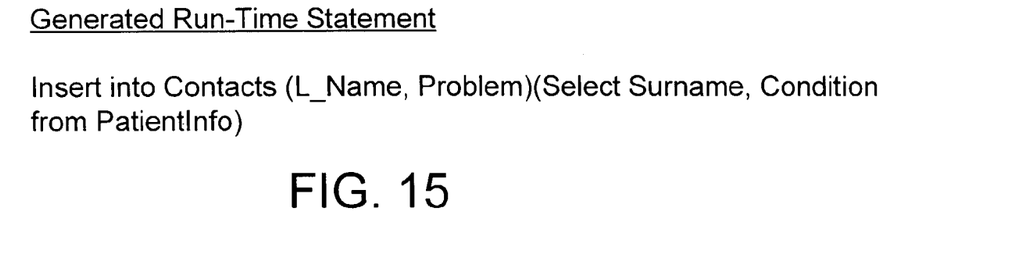
FIG. 15 shows a run-time statement that the database operation mechanism of the preferred embodiments generates from the abstract statement in FIG. 14.

FIG. 13 shows an abstract insert statement "Insert LastName, Condition into Contacts from PatientInfo". The database operation mechanism processes the abstract insert statement in FIG. 13 and determines that the PatientInfo table contains columns corresponding to the LastName and Condition abstract names. As a result, the database operation mechanism knows that the existing abstract query shown in FIG. 12 "Select * from PatientInfo" will return all columns from the PatientInfo table, including the columns corresponding to the LastName and Condition abstract names. As a result, the database operation mechanism can specify the existing abstract query "Select * from PatientInfo" as the data source for the insert statement. The resulting generated abstract statement is shown in FIG. 14. Note that the names in FIG. 14 are abstract names. Before executing the insert statement in FIG. 14, the abstract names must be mapped to the underlying database columns using the data repository abstraction 1010 shown in FIG. for the Contacts table shown in FIG. 11. The resulting run-time statement is shown in FIG. 15, where the LastName and Condition abstract names have been replaced by their corresponding column names in the Contacts table. Note that the run-time statement in FIG. 15 resembles an SQL statement, and thus the abstraction that aids the user in interacting with a database is no longer present in the generated run-time statement.

When processing the abstract insert statement of FIG. 13 using the existing abstract query in FIG. 12 as a data source, as described above with reference to FIGS. 11–15, we assume the database operation mechanism 126 of FIG. 1 preferably performs steps 810, 820, 830=YES, 832, 840 and 850 in FIG. 8. Next we consider the case where no predefined query exists that will return a result set that can satisfy the new database operation (step 830=NO). Two specific examples are shown, a first in FIGS. 16–20 and a second in FIGS. 21–23.

Figure 16:
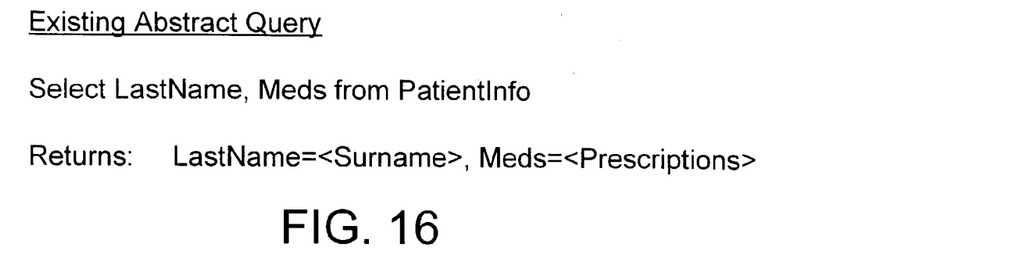
FIG. 16 shows an example of another existing abstract query for the PatientInfo table of FIG. 11 in accordance with the preferred embodiments.
Figure 17:
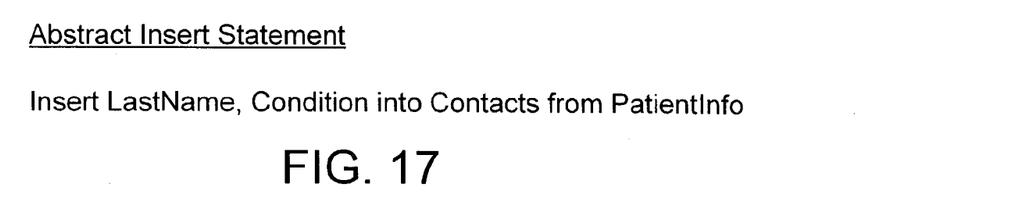
FIG. 17 is a reproduction of the abstract insert statement in FIG. 13.
Figure 18:
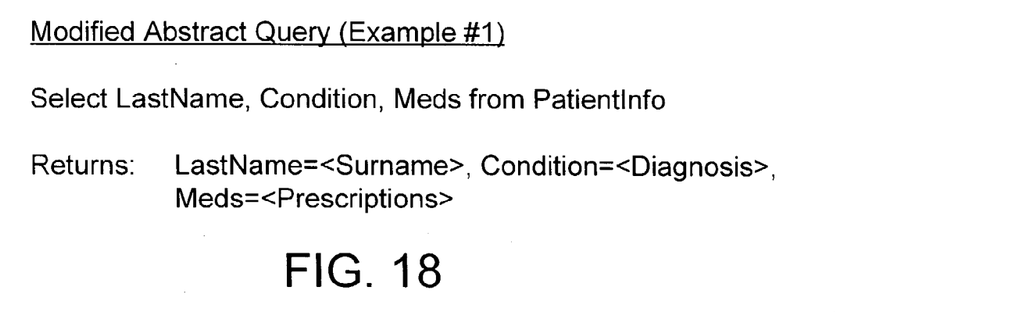
FIG. 18 illustrates a first example of how the database operation mechanism of the preferred embodiments may modify the abstract query in FIG. 16 to retrieve data needed to satisfy the insert statement in FIG. 17.
Figure 19:
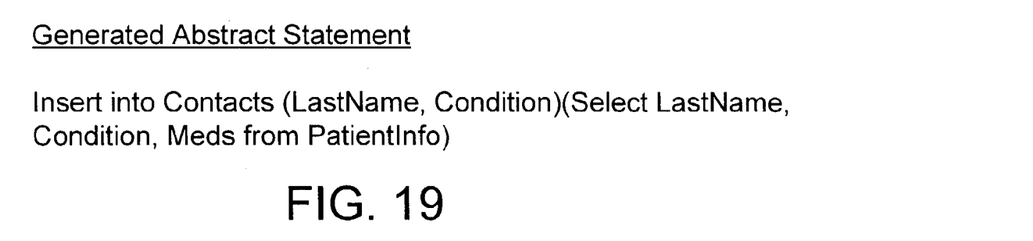
FIG. 19 shows how the database operation mechanism of the preferred embodiments may generate an abstract statement for the insert statement in FIG. 17 that specifies the modified abstract query in FIG. 18 as a data source for the insert statement.
Figure 20:
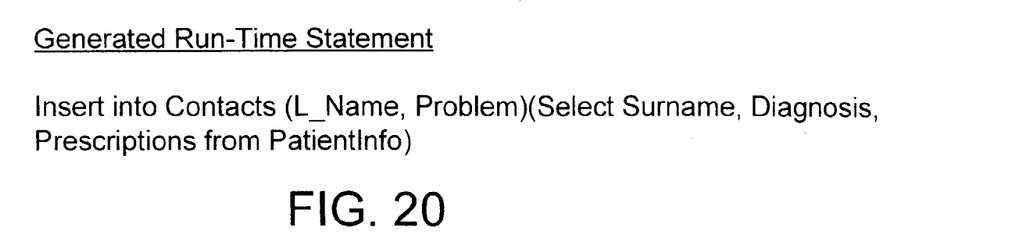
FIG. 20 shows a run-time statement that the database operation mechanism of the preferred embodiments generates from the abstract statement in FIG. 19.

The example in FIGS. 11–15 is similar to the example in FIGS. 16–20 in some respects. The abstract insert statement in FIG. 17 is identical to the statement in FIG. 12. A significant difference is that the existing abstract query in FIG. 16 does not return a result set that supplies all the needed data for the insert statement. The existing abstract query in FIG. 16 only returns data from the PatientInfo table for the LastName and Meds abstract names. The result set from the existing abstract query in FIG. 16 thus will not include values corresponding to the Condition abstract name in the insert statement of FIG. 17. As a result, step 830=NO in FIG. 8, and the database operation mechanism 126 must determine whether an existing database operation may be modified to return an appropriate result set. For the existing abstract query of FIG. 16, we assume the database operation mechanism 126 modifies the query as shown in FIG. 18 (in step 862 of FIG. 8) to return values corresponding to the Condition abstract name in addition to the LastName and Meds abstract names specified in the original query shown in FIG. 16. In this manner, the modified query will return a result set that contains data that will satisfy the insert operation. The resulting generated abstract statement is shown in FIG. 19 in an abstract form that resembles an SQL insert with subselect statement, which is processed using the data repository abstractions 910 and 1010 in FIGS. 9 and 10, respectively, to generate the run-time statement shown in FIG. 20.

Figure 21:
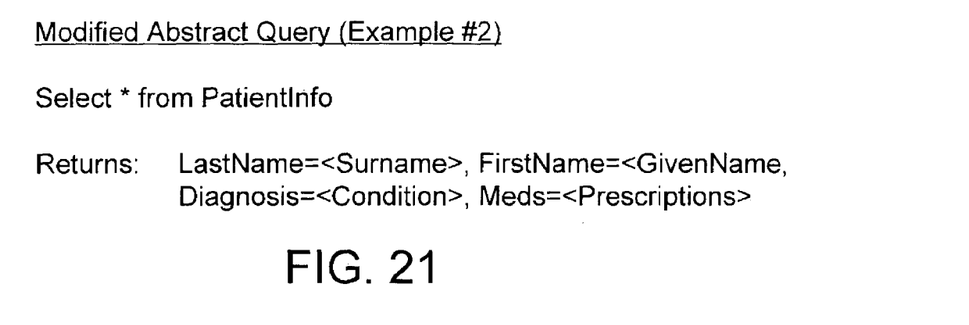
FIG. 21 illustrates a second example of how the database operation mechanism of the preferred embodiments may modify the abstract query in FIG. 16 to retrieve data needed to satisfy the insert statement in FIG. 17.
Figure 22:
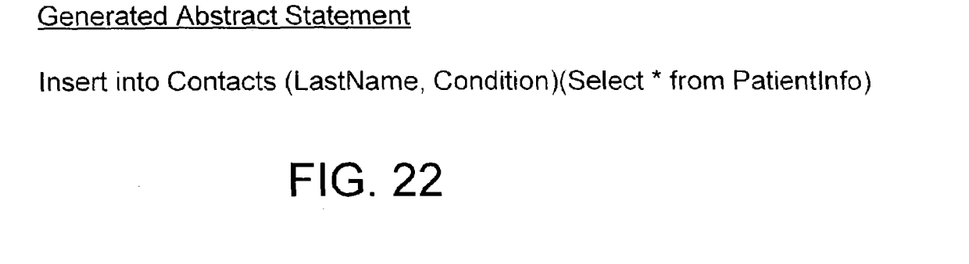
FIG. 22 shows how the database operation mechanism of the preferred embodiments may generate an abstract statement for the insert statement in FIG. 17 that specifies the modified abstract query in FIG. 21 as a data source for the insert statement.
Figure 23:
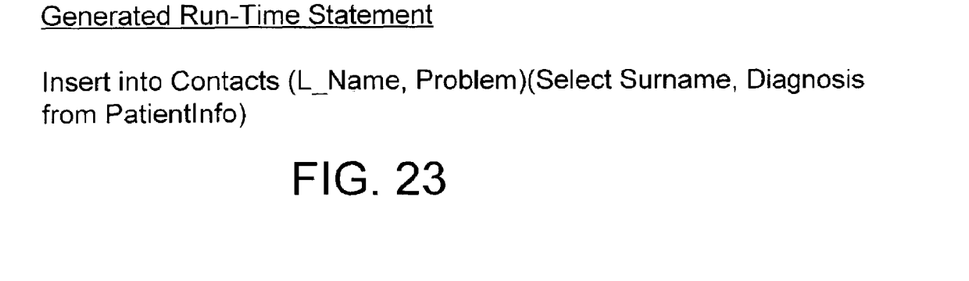
FIG. 23 shows a run-time statement that the database operation mechanism of the preferred embodiments generates from the abstract statement in FIG. 22.

FIG. 21 shows a second example of how the existing abstract query of FIG. 16 may be modified to produce a result set that satisfies the insert operation in FIG. 17. Instead of simply adding the missing field to the query, a "Select * from PatientInfo" is the modified abstract query that returns a result set that contains all columns in the PatientInfo table. The resulting generated abstract statement is shown in FIG. 22, with the corresponding run-time statement shown in FIG. 23.

Figure 24:
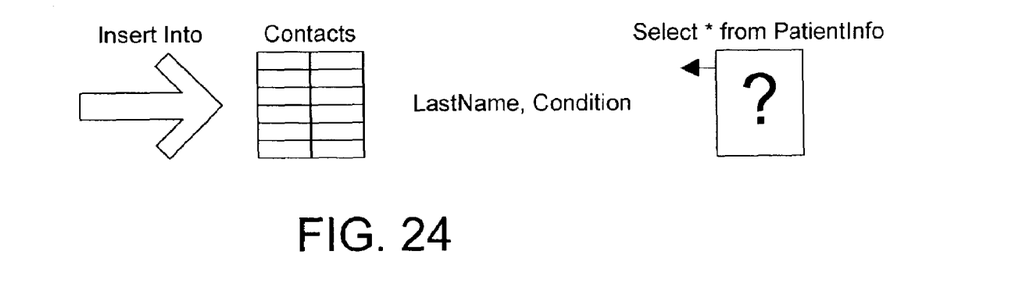
FIG. 24 shows an example of a graphical abstract query tool for generating a database operation that can specify a predefined query as a data source in accordance with the preferred embodiments.

FIG. 24 shows a simple example of how a graphical tool could be used to construct an abstract database operation that specifies a predefined database operation as a data source. We assume that an Insert Into icon (shown as a large arrow in FIG. 24) may be selected from a menu of possible database operations. An icon corresponding to the Contacts table in an area that includes many database tables may then be dragged and dropped next to the Insert Into icon, indicating that the insert operation should operate on the Contacts table. The LastName and Condition fields in the Contacts table may then be selected, as shown in FIG. 24. Finally, a data source may be specified. The data source could be a table, or could be a different database operation. An icon with a question mark is assumed to represent the predefined "Select * from PatientInfo" query. The user thus may drag and drop the predefined query into the new graphical abstract statement to specify the predefined query as a data source for the statement. In the prior art, a predefined database operation could not be specified as a data source. In this manner, the ability to reuse predefined database operations is significantly enhanced.

The preferred embodiments provide a significant enhancement over the prior art by allowing an existing database operation to be a data source for a different database operation. Note that this flow of data between database operation can extend as many levels deep as desired. Thus, a nesting of four different database operations could cause a first operation to be executed that produces a result set that serves as a data source for a second operation, which produces a result set that serves as a data source for a third operation, which produces a result set that serves as a data source for the fourth operation. The preferred embodiments expressly extend to specifying any suitable number of predefined operations as data sources for other database operations.

One example of multiple nested operations is provided below. We assume that a predefined query exists that returns patients with a specific diagnosis from a specified table. We assume this query is designed for generating research reports and thus contains many fields. This query may be the data source for an abstract create temporary table statement that only requires clinic number, name and the value of a specific test. The create temporary table statement may be the data source for a query that returns the average of the test column. The single value (average of the test column) may be specified as the data source for an abstract query that returns people that are above the average for a test and their address information. These four defined database operations and their flow of data is shown below.

--- select clinic number, hemoglobin, etc. from tables where hemoglobin > 10
\/
create temp table <query output>
\/
select avg(hemoglobin) from <table>
\/
select clinic number, phone number from <temp table> where hemoglobin > <query output>

---

If the first select statement specifies the phone number column, the data may be piped from one operation to the next as shown. If the first select statement does not specify the phone number column, the last select statement will require modification of the first select statement to return the phone number in the temp table so the phone numbers are returned in the results set in temp table.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, the discussion herein has emphasized the relational database realm, where data is stored in tables that include defined columns, where each entry in the table is a row in the table. Note, however, that the preferred embodiments expressly extend to any and all types of databases, whether now known or developed in the future. One example of a non-relational database is an object oriented database that stores data in extensible markup language (XML) format and is queried using one or more compatible XML query mechanisms.

What is claimed is:
1. An apparatus comprising:
(A) at least one processor;
(B) a memory coupled to the at least one processor;
(C) a database residing in the memory; and
(D) a database operation mechanism residing in the memory and providing instructions for the at least one processor to perform the steps of:
  (D1) identifying a predefined database operation and determining whether the predefined database operation provides a data source for a different database operation corresponding to a different database statement, and where the predefined database operation provides a data source, specifying the predefined database operation as a data source for the different database operation,
    wherein the predefined database operation provides the data source for the different database operation when executing the predefined database operation returns a result set that includes data needed by the different database operation such that the result set provides the data source for the different database operation;
  (D2) where the predefined database operation does not provide a data source for the different database operation, determining whether the predefined database operation is modifiable to serve as a data source for the different database operation;
  (D3) where the predefined database operation is modifiable to serve as a data source for the dif- ferent database operation and such modification is desirable based on at least one predetermined criterion, performing the steps of:
(D3A) modifying the predefined database operation; and
(D3B) specifying the modified database operation as the data source for the different database operation;
(D4) where the predefined database operation is not modifiable to serve as a data source for the different database operation or if such modification is not desirable based on the at least one predetermined criterion, generating an executable database operation from the different database statement and executing the executable database operation.

2. The apparatus of claim 1 wherein the predefined database operation is modifiable to serve as the data source for the different database operation if executing the modified database operation returns a result set that includes data needed by the different database operation.

3. A computer-implemented method for processing a new database statement, the method comprising the steps of:
(1) identifying a predefined database operation and determining whether the predefined database operation provides a data source for a new database operation that corresponds to the new database statement, and where the predefined database operation provides a data source, specifying the predefined database operation as a data source for the new database operation, wherein the predefined database operation provides the data source for the different database operation when executing the predefined database operation returns a result set that includes data needed by the different database operation such that the result set provides the data source for the different database operation;
(2) where the predefined database operation does not provide a data source for the new database operation, determining whether the predefined database operation is modifiable to serve as a data source for the new database operation;
(3) where the predefined database operation is modifiable to serve as a data source for the new database operation and such modification is desirable based on at least one predetermined criterion, performing the steps of:
(3A) modifying the predefined database operation; and
(3B) specifying the modified database operation as the data source for the new database operation;
(4) where the predefined database operation is not modifiable to serve as a data source for the new database operation or if such modification is not desirable based on the at least one predetermined criterion, generating a new executable database operation from the new database operation and executing the new executable database operation.

4. The method of claim 3 wherein the predefined database operation is modifiable to serve as the data source for the new database operation if executing the modified database operation returns a result set that includes data needed by the new database operation.

5. A program product comprising:
(A) a database operation mechanism that performs the steps of:
(A1) identifying a predefined database operation and determining whether the predefined database operation provides a data source for a different database operation, and where the predefined database operation provides a data source, specifying the predefined database operation as a data source for the different database operation, wherein the predefined database operation provides the data source for the different database operation if executing the predefined database operation returns a result set that includes data needed by the different database operation such that the result set provides the data source for the different database operation;
(A2) where the predefined database operation does not provide a data source for the different database operation, determining whether the predefined database operation is modifiable to serve as a data source for the different database operation;
(A3) where the predefined database operation is modifiable to serve as a data source for the different database operation and such modification is desirable based on at least one predetermined criterion, performing the steps of:
(A3A) modifying the predefined database operation; and
(A3B) specifying the modified database operation as the data source for the different database operation;
(A4) where the predefined database operation is not modifiable to serve as a data source for the different database operation or if such modification is not desirable based on the at least one predetermined criterion, generating an executable database operation from the different database operation and executing the executable database operation; and
(B) computer-readable medium in which computer instructions are stored, which instructions, when read by a computer, cause the computer to perform the steps of the database operation mechanism.

6. The program product of claim 5 wherein the predefined database operation is modifiable to serve as the data source for the different database operation if executing the modified database operation returns a result set that includes data needed by the different database operation.

* * * * *